(12) United States Patent
Lilie et al.

(10) Patent No.: US 11,287,170 B2
(45) Date of Patent: Mar. 29, 2022

(54) METHOD AND CONTROL SYSTEM FOR A REFRIGERATION SYSTEM AND REFRIGERATION APPLIANCE INCLUDING COMPRESSOR ASSOCIATED WITH SUCTION LINE AND REFRIGERATED COMPARTMENT

(71) Applicant: Embraco Industria de Compressores e Solucoes em Refrigeracao Ltda., Joinville (BR)

(72) Inventors: Dietmar Erich Bernhard Lilie, Joinville (BR); Cristiano Candido Valerio, Joinville (BR)

(73) Assignee: EMBRACO INDÚSTRIA DE COMPRESSORES E SOLUÇÕES EM REFRIGERAÇÃO LTDA., Joinville (BR)

( * ) Notice: Subject to any disclaimer, the term of this patent is extended or adjusted under 35 U.S.C. 154(b) by 181 days.

(21) Appl. No.: 16/426,520

(22) Filed: May 30, 2019

(65) Prior Publication Data
US 2019/0376734 A1 Dec. 12, 2019

(30) Foreign Application Priority Data
Jun. 7, 2018 (BR) .......................... 102018011553-7

(51) Int. Cl.
*F25B 49/02* (2006.01)
*F25D 11/02* (2006.01)
*F25D 29/00* (2006.01)

(52) U.S. Cl.
CPC .......... *F25B 49/022* (2013.01); *F25D 11/022* (2013.01); *F25D 29/005* (2013.01); *F25B 2600/02* (2013.01)

(58) Field of Classification Search
CPC ................ F25B 49/022; F25B 2600/02; F25B 2600/025; F25B 2600/0253; F25D 11/022;
(Continued)

(56) References Cited

U.S. PATENT DOCUMENTS

2013/0213064 A1* 8/2013 Gomes .................... F25D 29/00 62/115

* cited by examiner

*Primary Examiner* — Jonathan Bradford
(74) *Attorney, Agent, or Firm* — Foley & Lardner LLP

(57) ABSTRACT

A control method for a refrigeration system (10), with the refrigeration system (10) including at least one compressor (1) associated with at least one pair of suction lines ($L_2$, $L_3$, ... $L_N$), with each of the suction lines ($L_2$, $L_3$, ... $L_N$) respectively associated with at least one refrigerated environment ($C_1$, $C_2$, ... $C_N$). The method includes generating a system equivalent ($S_{eq}$) to the refrigeration system, with the equivalent system ($S_{eq}$) comprising at least one control parameter ($P_{C1}$, $P_{C2}$, ... $P_{CN}$) associated with each of the refrigerated environments ($C_1$, $C_2$, ... $C_N$). A control system for a refrigeration system and a refrigeration appliance are also described.

12 Claims, 7 Drawing Sheets

(58) Field of Classification Search
CPC .......... F25D 13/04; F24F 11/63; G06F 30/17; G06F 30/18; G06F 30/20
See application file for complete search history.

METHOD AND CONTROL SYSTEM FOR A REFRIGERATION SYSTEM AND REFRIGERATION APPLIANCE INCLUDING COMPRESSOR ASSOCIATED WITH SUCTION LINE AND REFRIGERATED COMPARTMENT

CROSS-REFERENCE TO RELATED APPLICATION

This application claims foreign priority under 35 USC § 119 to Brazilian Patent Application No. BR102018011553-7 filed Jun. 7, 2018, and the entire disclosure of said application is hereby expressly incorporated by reference into the present application.

FIELD

This invention refers to a method and control system for a refrigeration system. More specifically, it addresses a method and control system for a refrigeration system that uses a compressor working on more than one suction line. It also addresses a refrigeration appliance.

DESCRIPTION OF THE STATE OF THE ART

Most refrigeration appliance used today for storing foods at low temperatures (i.e., refrigerators) have at least two refrigerated environments, consisting basically of a freezer and a chiller (chiller compartment).

In order to cool these compartments, a double suction compressor may be used, meaning compressors that comprise two gas suction lines, wherein each suction line is associated respectively with a compartment to be cooled, such as a chiller and freezer, for example.

As the capacity demand for each compartment differs, and also because they perform different functions, some solutions have been developed in order to respond to the needs of each situation and particular context, designed mainly to provide independent refrigeration capacity control of refrigerated environments, in other words, the possibility of controlling the temperature of one environment without affecting the temperature of the adjacent environment.

A possible form of action lies in controlling certain compressor parameters, such as its operating rotation and operating fraction (the valve opening time defines how long each suction line will operate).

A possible form of control is thus based on control of the above-mentioned valve through the temperature in one of the compartments, such as the chiller, for example. As a result, control of this valve will alter the temperature of the chiller compartment. The temperature of the freezer is controlled through the compressor rotation action.

However, this proposal offers the disadvantage that, when the controller is activated in a first compartment where a disturbance occurs, a second compartment is also impacted by this same control situation. Ideally, the actuation (correction) should occur only in the first compartment where the disturbance occurred.

In other words, the solution described above does not constitute a sturdy system that can isolate the control of one compartment from the others. It comprises a system that is directly affected by external disturbances and thus does not produce the desired response to such disruptions (external disturbances) that occur.

In the system as described above, when there is a disturbance (i.e. an increase in the thermal load) in the first compartment, the temperature in the second compartment is also affected. This is due to the need for temperature correction in the first compartment by the disturbance in the system, which in fact functions in both compartments, when it should function only in the first compartment.

As a result, the state of the art does not include a refrigeration system control method suitable for controlling the temperature of two (or more) compartments independently, through a compressor working on more than one suction line.

The state of the art comprises the optimization of compartment temperature control when applied to a compressor with a single suction inlet that results in temperature variations in the compartments, when activated, in order to attenuate disturbances in one of the compartments.

SUMMARY AND OBJECTIVES OF THE INVENTION

In this context, in order to surmount problems known the state of the art as mentioned above, this invention proposes a sturdy control system for independent temperature control in at least two different compartments in a refrigeration appliance.

Furthermore, this invention also proposes the implementation of a control method for a refrigeration system that uses a single compressor associated with at least two compartments. Obviously, the reference to two compartments may not be construed as a constraint on this invention, whereby the teachings proposed may be applied perfectly well to refrigeration systems comprised of two or more refrigerated compartments, as addressed in greater detail below.

When applied to a system that comprises two environments to be refrigerated (two evaporators), the proposed method is based on modeling the compressor as two independent virtual compressors; in other words, with the proposed methodology, it is possible to control a single compressor that works like two compressors, thus allowing it to function in only one of the refrigerated environments.

In a beneficial manner, the implementation of a system and method as proposed allows temperature correction in response to a disturbance in a compartment while not affecting the temperature in the other compartment; in other words, the proposed system and method allow independent temperature control in the compartments of a refrigeration appliance.

Similarly, when applied to a system that comprises more than two environments to be refrigerated (more than two evaporators), the proposed method is based on modeling the compressor into independent virtual compressors, wherein each virtual compressor is associated with a single evaporator (or chiller compartment). Thus, with the proposed methodology, it is possible to control a single compressor that functions as several independent compressors, consequently controlling the temperature of each evaporator independently.

A first objective of this invention is to provide a control system for a refrigeration system fitted with a compressor that works on more than one suction line.

A second objective of this invention is to provide a control system for handling the temperatures of at least two different compartments in a refrigeration appliance.

A third objective of this invention is to provide a control method for a refrigeration system with a compressor with two (or more) suction lines, wherein this compressor is modeled as two (or more) virtual compressors, with the said equivalent (virtual) compressors constituting an independent compressor or each the refrigerated environments or cooling circuits.

A fourth objective of this invention is to provide a system and control method suitable for providing independent control of at least two compartments in a refrigeration system with a single compressor fitted with at least two suction lines.

A fifth objective of this invention is to provide a system and control method comprising at least one control parameter associated with each of the refrigerated environments.

A sixth objective of this invention is to establish a ratio for the control parameters, the compressor rotation and the compressor control valve opening time for each suction line.

Another objective of this invention is to provide a methodology and system that can function in refrigeration systems comprised of two or more evaporators.

The objectives of this invention are attained through a control method for a refrigeration system, with the refrigeration system comprising: at least one compressor and at least one pair of suction lines, with each of the suction lines respectively associated with at least one refrigerated environment, wherein the method comprises the steps of: generating compressors that are equivalent to the compressor, with the equivalent compressors comprising at least one control parameter associated with each of the refrigerated compartments.

It also addresses a control method for a refrigeration system that comprises the steps of: establishing a reference temperature for each of the refrigerated environments, defining at least one variation (error) rate between a current temperature and a reference temperature for each of the refrigerated environments, defining at least one control parameter from the variation rates, associated with each of the refrigerated environments.

The objectives of this invention are also attained through a refrigeration system control system, with the refrigeration system comprising: at least one compressor fitted with at least one pair of suction lines, with each of the suction lines respectively associated with at least one refrigerated environment (compartment), whereby the control system also comprises: at least one control parameter associated with each refrigerated environment, obtained from at least one control loop associated with each refrigerated environment.

This also addresses a refrigeration appliance, according to the teachings of this invention.

BRIEF DESCRIPTION OF THE DRAWINGS

This invention will be described in greater detail below, based on an example of an embodiment demonstrated in the drawings. The Figures show.

DETAILED DESCRIPTION OF THE INVENTION

Figure 1:
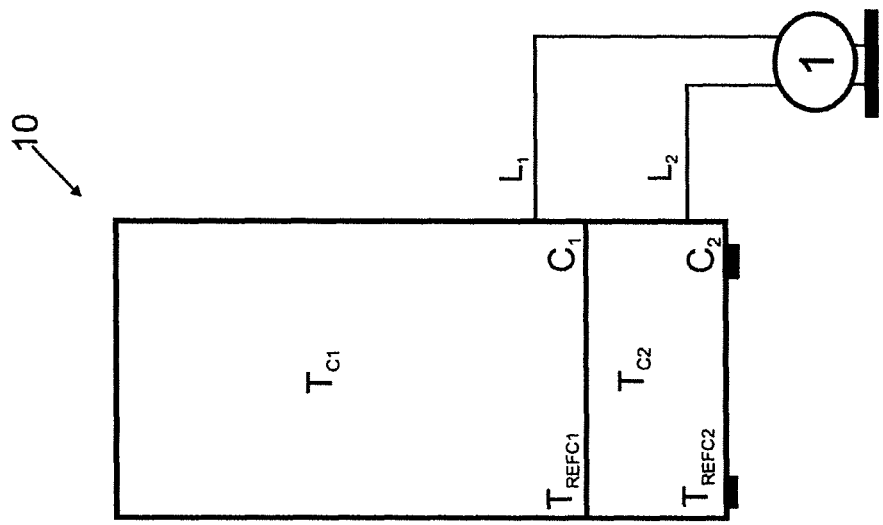
FIG. 1—is a representation of a refrigeration system suitable for absorbing the teachings of this invention.

In the initial mention of FIG. 1, this invention refers to a control method for a refrigeration system 10, more specifically, a control method for a refrigeration system 10 that comprises a compressor 1. In a non-limiting embodiment, the compressor 1 may be configured as a double suction compressor, as shown in FIG. 1. Nevertheless, it is stressed that the teachings proposed herein are not limited to their application in a double suction compressor, whereby any compressor known at the state of the art is suitable for embodying the concepts proposed herein.

In general terms, the compressor 1 must be understood as the compressor associated with at least two suction lines, such as compressor 1 shown in FIGS. 1, 6, 7 and 8. It is thus noted that compressor 1 comprises at least a first suction line $L_1$ and a second suction line $L_2$. According to the teachings of this invention, suction lines $L_1, L_2 \ldots L_N$ are thus understood as "branches" of the refrigeration system 10, associated with each of the refrigerated compartments (evaporators).

Figure 6:
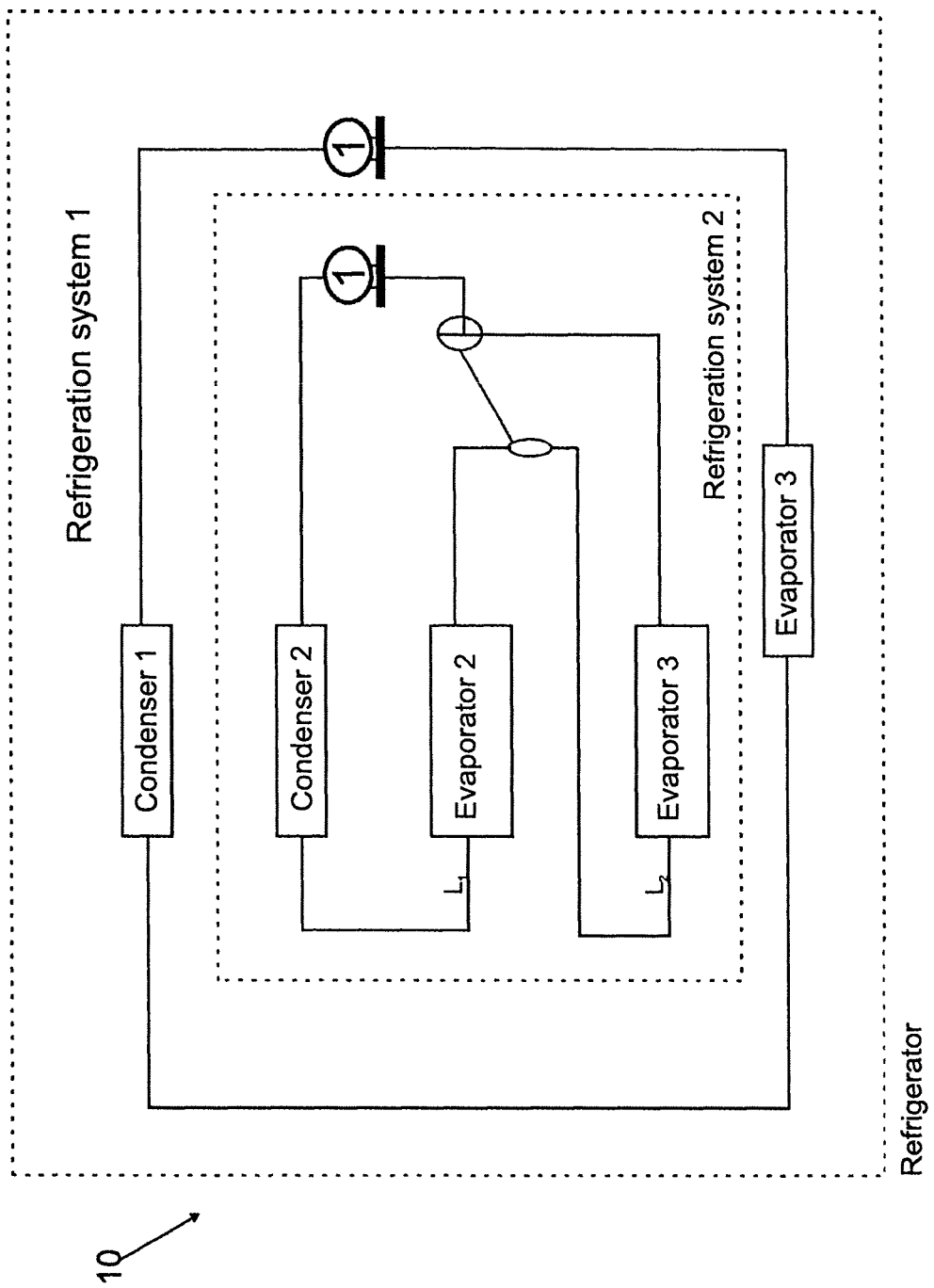
FIG. 6—illustrates an additional representation of a refrigeration system suitable for absorbing the teachings of this invention.
Figure 7:
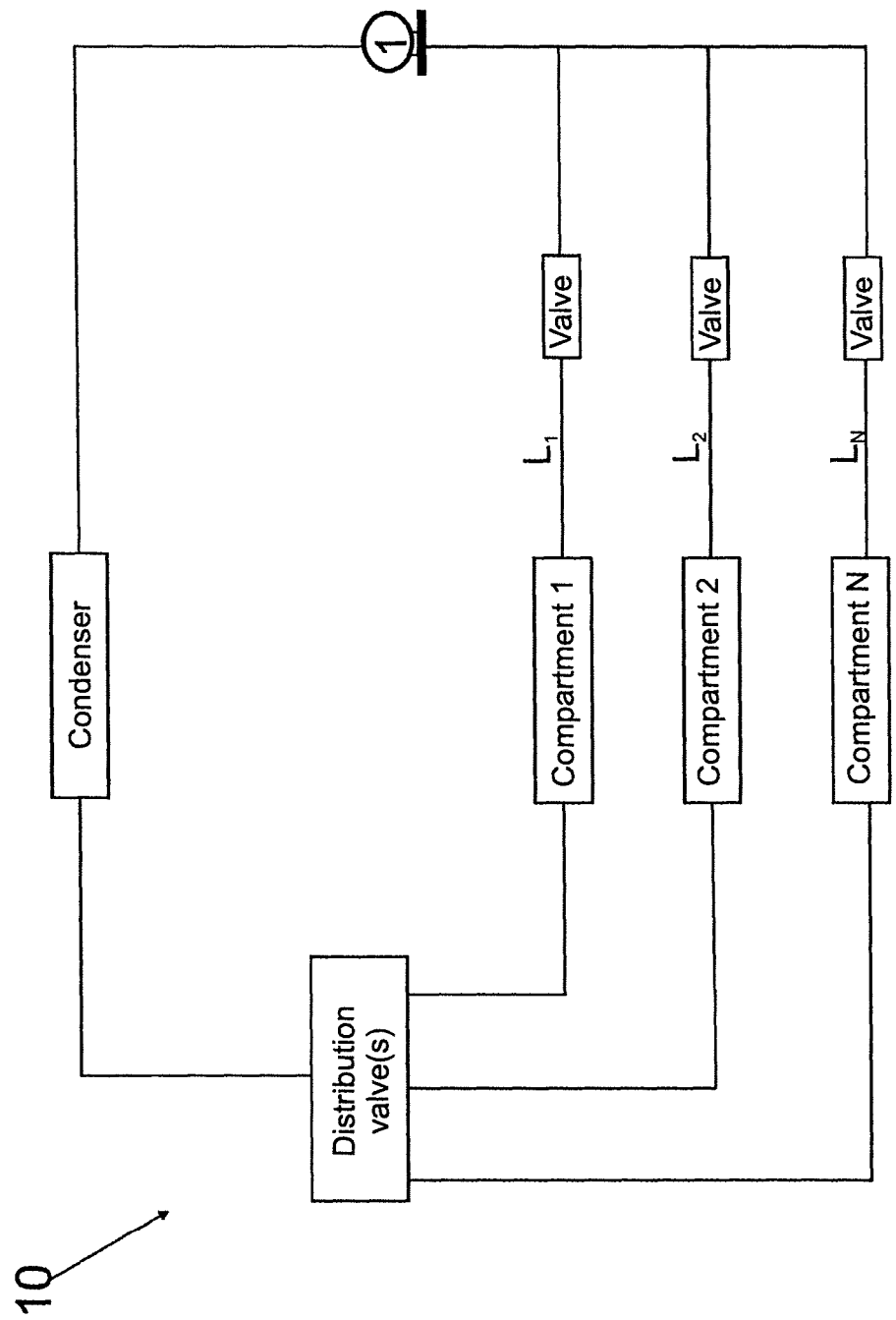
FIG. 7—is an additional representation of a refrigeration system suitable for absorbing the teachings of this invention, wherein the said system is fitted with multiple refrigerated compartments.
Figure 8:
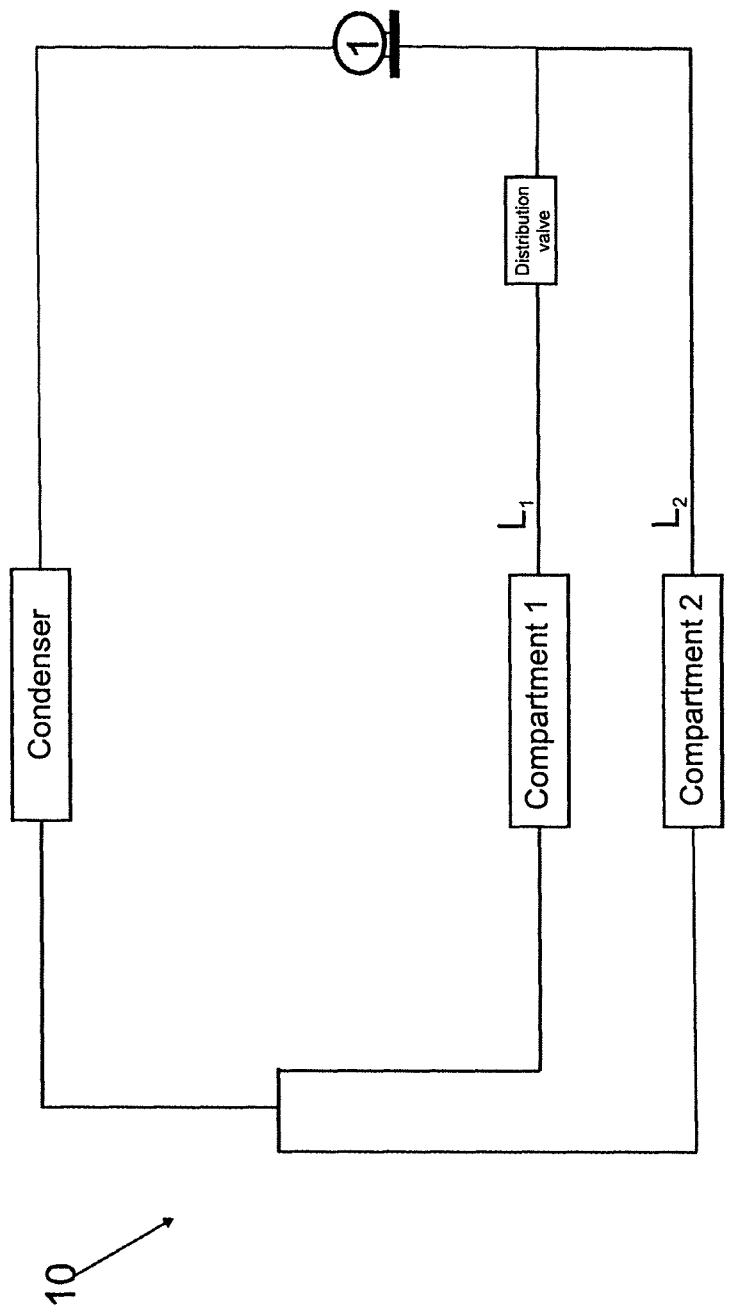
FIG. 8—is an additional representation of a refrigeration system suitable for absorbing the teachings of this invention, wherein the said system comprises two refrigerated compartments.

As already mentioned, the compressor 1 may be associated with two or more suction lines $L_1, L_2 \ldots L_N$, as shown in the illustrations of the refrigeration systems 10 in FIGS. 6, 7 and 8. Furthermore, such suction lines $L_1$ and $L_2$ may be arrayed in series (FIG. 6) or in parallel (FIGS. 1, 7 and 8). Furthermore, distribution valves with any configuration known at the state of the art may be used in the illustrated refrigeration systems 10. Moreover, the distribution valves may be arrayed inside the compressor or external it, with valve placement not being considered as a constraint on this invention.

Furthermore, in the embodiment of this invention illustrated in FIG. 1, the compressor 1 is associated with at least one pair of refrigerated environments (compartments), such as the compartments in a refrigeration appliance (either commercial or residential). Consequently, and with reference to FIG. 1, it is understood that the first suction line $L_1$ is associated with a first compartment $C_1$ and the second suction line $L_2$ is associated with a second compartment $C_2$, wherein each of the compartments $C_1$ and $C_2$ is comprised of a separate evaporator. In a non-limiting embodiment, the first compartment $C_1$ may represent the chiller and the second compartment $C_2$ may represent the freezer of a refrigeration appliance 20.

It is stressed that the teachings of this invention may also be absorbed by refrigeration systems comprised of more than two refrigerated compartments $C_1, C_2 \ldots C_N$, as shown in FIG. 7. Furthermore, the arrangement of the second compartment $C_2$ and the first compartment $C_1$, as shown in FIG. 1, may not be considered as a constraint on this invention.

Moreover, arrangements are fully valid wherein both the first compartment $C_1$ and the second compartment $C_2$ constitute the chiller (or freezer) of a refrigeration appliance 20.

In general terms, the refrigerated compartments $C_1$, $C_2$, ... $C_N$ must be understood as the cooling circuits of the compressor 1.

As already mentioned previously, it is known that one of the challenges found at the state of the art consists of controlling the temperatures in each compartment $C_1$, $C_2$ ... $C_N$ when so-called thermal disturbances occur in the refrigeration system 10 (for example, opening doors, storing hot products, among others).

Consequently, taking FIG. 1 as a reference, the challenge arises of avoiding the so-called crossover effect: in other words, controlling the temperature in the first compartment $C_1$ (in this case, the chiller) with no temperature variations in the second compartment $C_2$ (in this case, the freezer), in other words, without temperature variations in the chiller also causing temperature variations in the freezer.

This invention encompasses a control methodology for the refrigeration system 10 that allows independent temperature control in refrigerated compartments $C_1$ and $C_2$, thus avoiding the crossover effect for temperature control.

More specifically, and with regard to FIG. 1, this invention initially proposes to model a compressor 1 as two fictitious compressors, thus allowing independent control of the control parameters of each of these equivalent compressors, in order to send a control signal to compressor 1 and thus adjust the temperatures of each of the refrigerated environments.

This invention is thus based on the possibility of representing a compressor fitted with at least two suction lines $L_1$, $L_2$ on at least two equivalent compressors (with each equivalent compressor linked to a suction line of the compressor 1) that can be controlled independently.

Pursuing a better description of the invention, a theoretical approach is valid for the equivalent compressors managed (generated) through compressor 1.

Figure 2:
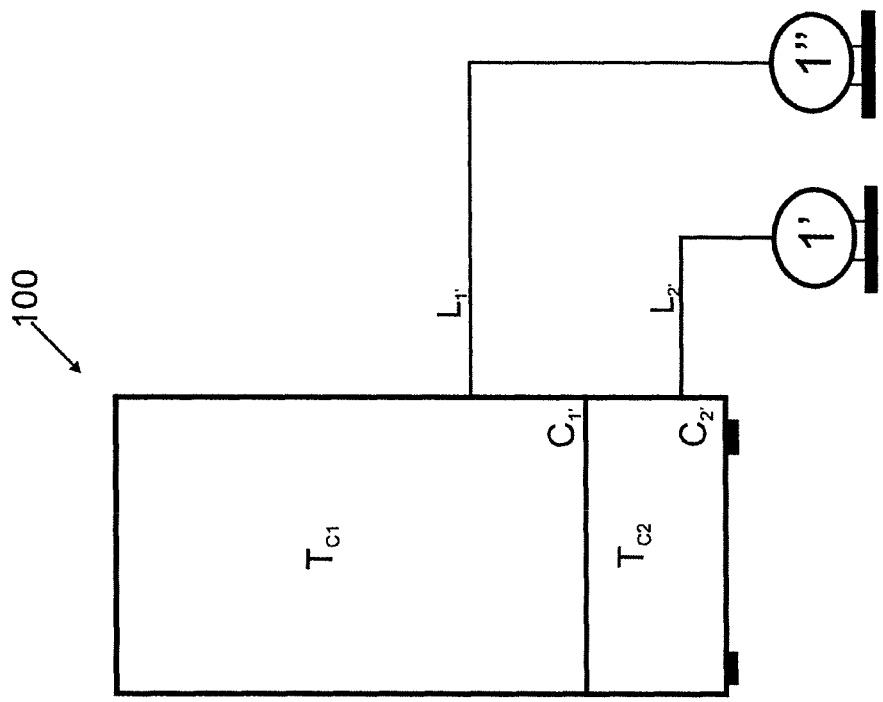
FIG. 2—is a representation of a refrigeration system as set forth in the teachings addressed in this invention, with two hypothetical compressors, each independently controlling the refrigeration capacity of a compartment.

With regard to FIG. 2, a theoretical refrigeration system 10 is initially considered, comprised of two refrigerated environments $C_{1'}$ and $C_{2'}$, two evaporators (not shown) and also using two compressors 1' and 1".

Considering the mass flow ($\dot{m}$) equation for each of the environments (meaning each one of environments $C_{1'}$ and $C_{2'}$) of the refrigeration system 10, leads to (Equation I):

$$\dot{m}_1 = V_{SW} \cdot \rho_1 \cdot N_1; \text{ and}$$

$$\dot{m}_2 = V_{SW} \cdot \rho_2 \cdot N_2,$$

wherein:

$\dot{m}_1$ and $\dot{m}_2$=mass flow rate imposed by the compressor in each of suction lines $L_{1'}$ and $L_{2'}$, respectively.

$V_{sw}$=volumetric displacement of the compressor;

$\rho_1$ and $\rho_2$=refrigerant fluid density for each suction line; and $N_1$ and $N_2$=compressor rotation 1" (first compartment C1') and 1' (second compartment C2'), respectively.

Consequently, based on the mass flow rate equations for the scenario using two independent compressors 1' and 1", an attempt was made to adapt these equations to the scenario using a single double suction compressor 1, thus constituting an ideal scenario of full independence between each of suction lines $L_1$ and $L_2$ of the double suction compressor 1.

Thus, Equation I was adapted to the double suction compressor 1 shown in FIG. 1 (Equation II):

$$\dot{m} = V_{sw} \cdot \rho_1 \cdot N_C \cdot DC + V_{sw} \cdot \rho_2 \cdot N_C \cdot (1-DC),$$

wherein:

$N_C$=actual rotation of the compressor 1;

DC=Duty Cycle=Cycle Ratio=operating fraction=ratio between the time that the compressor operates on suction line $L_1$ and the total completion time of a switch cycle for both suction lines;

(1−DC)=ratio between the time that the compressor operates on suction line $L_2$ and the total completion time of a switch cycle for both suction lines. In a double suction compressor, it is known that the sum of the Duty Cycle (DC) for both lines is equal to 1.

Consequently, Equation II may also be presented in the following manner (Equation III):

$$\dot{m} = V_{sw} \cdot \rho_1 \cdot N_1 + V_{sw} \cdot \rho_2 \cdot N_2,$$

wherein:

$N_1 = N_C \cdot DC$ (based on Equation II), and $N_2 = N_C \cdot (1-DC)$, also based on Equation II.

As a result, Equation III may be simplified in order to show that the mass flow rate of the double suction compressor ($\dot{m}$) is equal to the mass flow rate of the first suction line $L_1$ ($\dot{m}_1$) added to the mass flow rate of the second suction line $L_2$ ($\dot{m}_2$). In other words, the total mass flow rate ($\dot{m}$) is equal to the sum of the mass flow rate ($\dot{m}$) of each of the suction lines.

Consequently, a relation is established between the hypothetical compressor rotation applied to the first suction line $L_1$ and the hypothetical compressor rotation applied to the second suction line $L_2$, whereby, based on Equation (II):

$$\dot{m} = V_{sw} \cdot \rho_1 \cdot N_C \cdot DC + V_{sw} \cdot \rho_2 \cdot N_C \cdot (1-DC) \quad \text{(Equation II), and}$$

$$N_1 + N_2 = N_C \cdot DC + N_C \cdot (1-DC) \quad \text{(Equation IV)}$$

Simplifying Equation IV leads to:

$$N_1 + N_2 = N_C \quad \text{(Equation V)}$$

It is stressed that the representation of Equation IV disregards the $V_{sw}$, $\rho_1$ and $\rho_2$ values, as the purpose of this modeling consists of finding a relation between hypothetical rotations of each suction line in function of the actual rotation of the double suction compressor and its Duty Cycle (Cycle Ratio).

Having determined that $N_1 + N_2 = N_C$ (Equation V), the Duty Cycle may then be modeled, based on Equation II, which showed that $N_1 = N_C \cdot DC$. This consequently leads to:

$$DC = \frac{N_1}{N_C}. \quad \text{(Equation VI)}$$

Thus, based on Equation V (shown below), it is clear that compressor 1 as shown in FIG. 1 may be represented as an equivalent system controlled through its hypothetical rotation with each of the suction lines $L_1$ and $L_2$. In other words, the double suction compressor 1 may be represented as a system equivalent to two compressors, wherein each of these compressors works on a single suction line. This thus makes it possible to obtain a control methodology for the double suction compressor with independent control of each of the suction lines.

$$N_1 + N_2 = N_C$$

Similarly, Equation VI (shown below) allows the double suction compressor 1 Duty Cycle to be linked to the first suction line $L_1$ rotation, in other words, $N_1$, and also the double suction compressor ($N_C$) rotation, as:

$$DC = \frac{N_1}{N_C}$$

This consequently leads to a Duty Cycle value for the first suction line $L_1$ ($DC_1=N_1/N_C$) and obviously a Duty Cycle value for the second suction line $L_2$($DC_2=1-DC_1$). This consequently gives the compressor valve operating times on each of the suction lines.

Thus, based on Equations V and VI set forth above, this invention addresses a control method for a refrigeration system 10 that allows independent control of the temperature in each of the refrigerated compartments $C_1$ and $C_2$, thus avoiding improper temperature variations in one of the compartments.

As already mentioned previously, the above modeling is not limited to a scenario where the refrigeration system is comprised of only two refrigerated compartments $C_1$, $C_2$, whereby the teachings of this invention may be applied perfectly well to refrigeration systems comprised of more than two compartments $C_1$, $C_2$ ... $C_N$, as shown below. Reference is made to FIG. 7:

Similar to Equation I, there is a mass flow rate ($\dot{m}$) equation N for refrigerated compartments $C_1$, $C_2$ ... $C_N$:

$$\dot{m}_1 = V_{SW1} \cdot \rho_1 \cdot N_1;$$

$$\dot{m}_2 = V_{SW2} \cdot \rho_2 \cdot N_2; \text{ and}$$

$$\dot{m}_N = V_{SWN} \cdot \rho_N \cdot N_N;$$

Similar to Equation II, there is:

$$\dot{m} = V_{sw} \cdot (\rho_1 \cdot N_C \cdot DC_1 + \rho_2 \cdot N_C \cdot DC_2 + \ldots \rho_N \cdot N_C \cdot DC_N),$$

wherein:

$N_C$ refers to the compressor rotation associated with N suction lines, such as for compressor 1 as shown in FIG. 7.

Similar to Equation III, there is:

$$\dot{m} = \dot{m}_1 \cdot DC_1 + \dot{m}_2 \cdot DC_2 + \ldots \dot{m}_N \cdot DC_N$$

From the equation equivalent to Equation II, there is Equation II (A):

$$N_1 = N_C \cdot DC_1,$$

$$N_2 = N_C \cdot DC_2,$$

$$N_2 = N_C \cdot DC_2,$$

$$N_N = N_C \cdot DC_N, \text{ Adding together } N_1, N_2 \text{ and } N_N:$$

$$N_1 + N_2 + \ldots N_N = N_C(DC_1 + DC_2 + \ldots DC_N)$$

As $DC_1 + DC_2 + \ldots DC_N$ must be equal to 1, there is:

$$N_1 + N_2 + \ldots N_N = N_C$$

Furthermore, isolating $DC_1$, $DC_2$ and $DC_N$ from Equation II (A):

$$DC_1 = \frac{N_1}{N_C},$$

$$DC_2 = \frac{N_2}{N_C},$$

$$DC_N = \frac{N_N}{N_C},$$

The actual compressor rotation $N_C$ is thus related to each of the hypothetical rotations linked to each of the suction lines $L_1$, $L_2$, ... $L_N$. Similarly, the Duty Cycle values are linked to each of the suction lines ($DC_1$, $DC_2$, ... $DC_N$). In other words, the times are obtained when a refrigeration system 10 valve must operate on each suction line $L_1$, $L_2$, ... $L_N$.

It has thus been demonstrated that the proposed modeling may be applied to refrigeration systems comprising two or more suction lines.

In order to implement the teachings of this invention, a reference temperature must initially be established for each of the refrigerated compartments. Consequently, based on the representation shown in FIG. 1, a reference temperature must be established for the chiller compartment $T_{REFC1}$ and a reference temperature for the freezer compartment $T_{REFC2}$.

The said reference temperatures $T_{REFC1}$ and $T_{REFC2}$ must be understood as the ideal operating temperatures for respectively the first compartment $C_1$ and the second compartment $C_2$, and may be set directly by the user of the refrigerator (refrigeration appliance) 20 or may also be factory-set through the electronic control of the refrigerator 20, depending on its operating mode (vacation mode, fast cooling mode, energy-saving mode and others).

Thus, based on the reference temperature values $T_{REFC1}$, $T_{REFC2}$ set for the first compartment $C_1$ and the second compartment $C_2$, an error is defined for the current temperature in the said compartments $C_1$ and $C_2$.

More specifically and based on the second compartment $C_2$ shown in FIG. 1, an error $\Delta_{C2}$ is defined, related to the reference temperature of the second compartment $T_{REFC2}$ and its current temperature $T_{C2}$. Even more specifically, the error must be understood as the difference between the reference temperature of the second compartment $T_{REFC2}$ and its current temperature $T_{C2}$, in other words: $\Delta C_2 = T_{REFC2} - T_{C2}$. Similarly, the error for the first compartment $\Delta_{C1}$ must be understood as: $\Delta_{C1} = T_{REFC1} - T_{C1}$. In a refrigeration system fitted with N compartments, this results in: $\Delta_{CN} = T_{REFCN} - T_{CN}$.

Based on these error rates $\Delta_{C1}$, $\Delta_{C2}$, ... $\Delta_{CN}$, the teachings of this invention propose obtaining at least one control parameter $P_{C1}$, $P_{C2}$ ... $P_{CN}$ associated respectively with the first and second refrigerated compartments $C_1$ and $C_2$.

These control parameters $P_{C1}$ and $P_{C2}$ must be understood as parameters linked to the refrigeration capacity of the refrigeration system 10 in order for the current temperature of one of the compartments $T_{C1}$ and $T_{C2}$ to reach its respective reference temperature $T_{REFC1}$ and $T_{REFC2}$. In other words, it is understood that the current temperature of the first compartment $T_{C1}$ will reach its reference temperature $T_{REFC1}$ and the current temperature of the freezer $T_{C2}$ will reach its reference temperature $T_{REFC2}$.

In this embodiment of the invention, control parameters $P_{C1}$, $P_{C2}$ respectively represent rotation parameters $N_{C1}$, $N_{C2}$, associated with refrigerated compartments $C_1$ and $C_2$. Consequently, these rotation parameters $N_{C1}$ and $N_{C2}$ must be understood as being the respective rotation values of each of the equivalent compressors shown through the approach used in Equation V.

Figure 3:
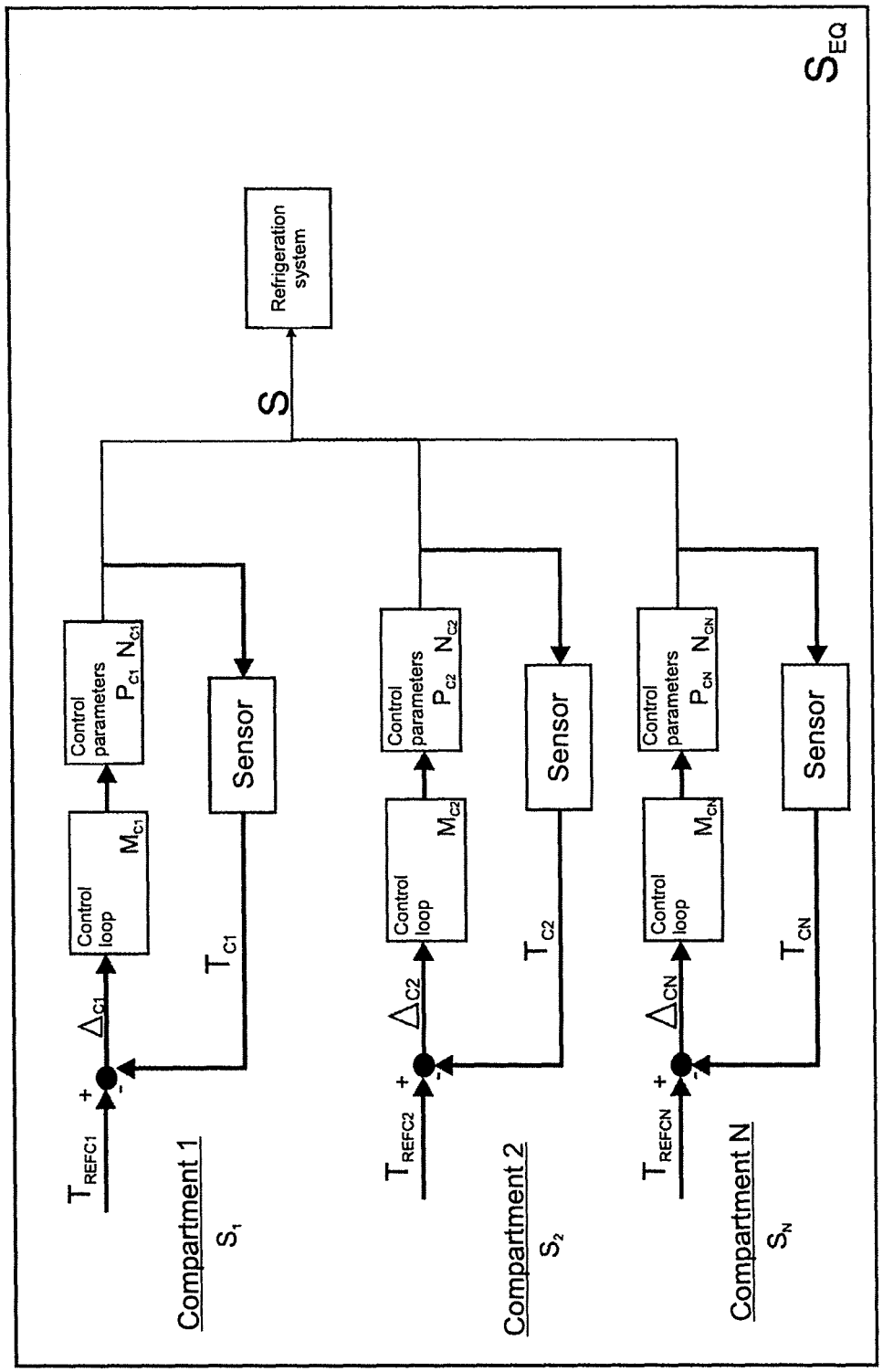
FIG. 3—is a representation of the equivalent control system obtained through the teachings of this invention, wherein an independent equivalent system is noted, for each of the refrigerated environments.

In this embodiment of the invention, and referring to FIG. 3, control parameters $P_{C1}$ and $P_{C2}$ are respectively obtained from the control loops (controllers) $M_{C1}$ and $M_{C2}$, wherein each control loop $M_{C1}$ and $M_{C2}$ is respectively associated with a refrigerated compartment $C_1$ and $C_2$.

Consequently, and based on the representation in FIG. 3 of the first compartment $C_1$, it is understood that the compressor rotation parameter for the first compartment $N_{C1}$ is obtained from the control loop $M_{C1}$ and is equivalent to a fictitious value for the equivalent compressor of the first compartment $C_1$ whereby the current temperature $T_{C1}$ reaches the reference temperature $T_{REFC1}$.

Similarly, and now considering the representation of the freezer (second compartment $C_2$) shown in FIG. 3, it is understood that the rotation parameter of the second compartment $N_{C2}$ obtained from the control loop $M_{C2}$ and is equivalent to a fictitious value for the equivalent compressor of the second compartment whereby the current temperature $T_{C2}$ reaches the reference temperature $T_{REFC2}$.

It is thus understood that this invention uses independent control systems for each of the refrigerated compartments, in this case the first compartment $C_1$ and the second compartment $C_2$, as shown in FIG. 3. As a result, the temperature of each of these compartments may be controlled independently, without temperature variations in one compartment affecting the temperature of the adjacent compartment.

With regard to FIGS. 1 and 3, it is understood that the proposed methodology manages (generates) independent control systems that work as fictitious compressors with each of the suction lines $L_1$ and $L_2$ of the compressor 1. In other words, the proposed methodology allows the control of a refrigeration system 10 which uses compressor 1 as though the system 10 were comprised of one compressor for suction line $L_2$ and one compressor for suction line $L_1$.

To do so, it is proposed that the independent control system of the first compartment $C_1$ and the independent control system of the second compartment $C_2$ respectively comprise control loops $M_{C1}$ and $M_{C2}$.

In this embodiment of the invention, such control loops $M_{C1}$ and $M_{C2}$ are preferably configured as proportional integral derivative controllers (PID controllers). Nevertheless, it is stressed that this characteristic may not be considered as an aspect imposing limits on this invention, as other types of controllers may be used, such as proportional, proportional integral and proportional derivative controllers, as well as fuzzy controllers.

In brief, it is stressed that any controller may be used, if able to generate a capacity (rotation) signal from an error signal (such as a temperature error signal, meaning errors $\Delta_{C1}$, $\Delta_{C2}$).

In an alternative embodiment, the use of one type of controller is proposed for the independent control system of the second compartment (such as a PID controller) and another type of controller for the independent control system of the first compartment (such as a proportional integral controller or a fuzzy controller).

With rotation parameters $N_{C1}$ and $N_{C2}$ established respectively through control loops $M_{C1}$ and $M_{C2}$, they must now be consolidated into a control signal S, to be effectively applied in compressor 1.

Referring specifically to FIG. 3 and Equations V and VI as mentioned above, control signal S to be sent to the double suction compressor 1 is linked to a compressor operating rotation $N_C$ and its Cycle Ratio (Duty Cycle).

Consequently, having obtained the independent rotation parameters for the first compartment $N_{C1}$ and the second compartment $N_{C2}$, an operating rotation value may be obtained for the compressor $N_C$ by adding together $N_{C1}$ and $N_{C2}$; in other words, adding together the respective rotation of each of the fictitious compressors as indicated in Equation V:

$$N_1 + N_2 = N_C$$

Similarly, the Cycle Ratio (Duty Cycle) of compressor 1 may be obtained through dividing the rotation linked to the first suction line $L_1$ by the compressor operating rotation $N_C$, as indicated in Equation VI:

$$DC = \frac{N_1}{N_C}$$

There is thus a Cycle Ratio linked to the first suction line $L_1$ ($DC_1 = N_1/N_C$) and obviously a Cycle Ratio linked to the second suction line $L_2$ ($DC_2 = 1 - DC_1$).

As a result, the control signal S corresponds to a signal effectively applied to the compressor 1 and coming from two equivalent compressors, wherein one equivalent compressor is linked to the first compartment $C_1$ and the other equivalent compressor is linked to the second compartment $C_2$. It is thus understood that the equivalent compressors respectively constitute an equivalent system of the first compartment $S_1$ and an equivalent system of the second compartment $S_2$, as shown in FIG. 3.

Figure 4:
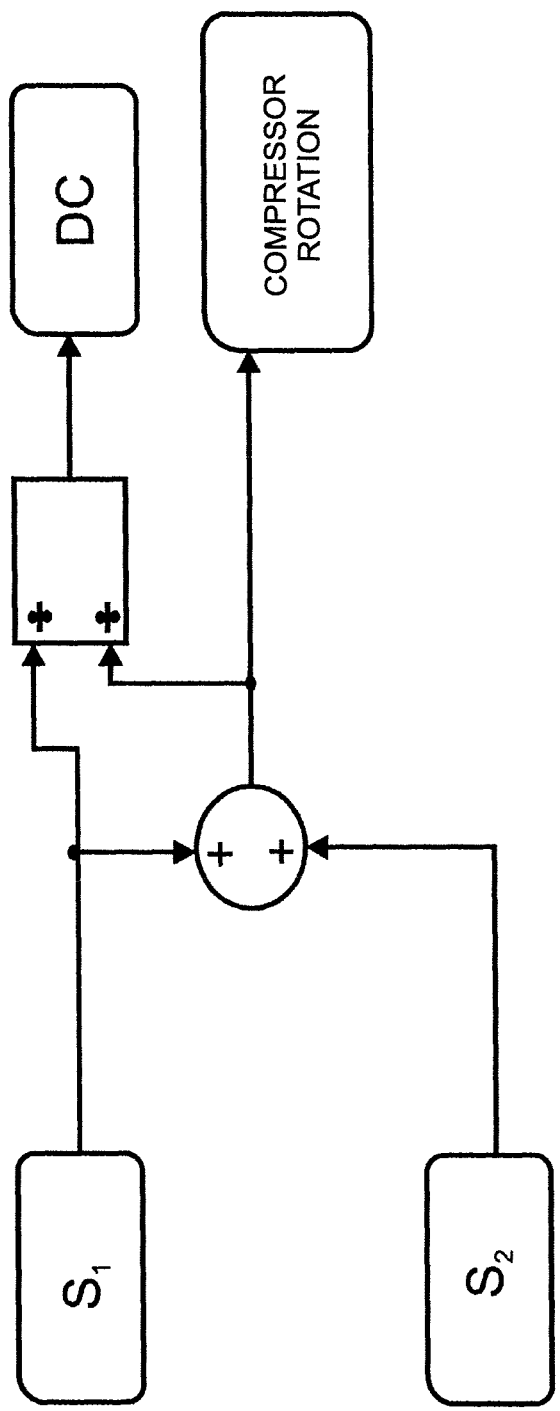
FIG. 4—is a representation of the way of obtaining a control signal through a control loop addressed in this invention.

FIG. 4 presents a simplification of the equivalent circuit $S_{eq}$ shown in FIG. 3, wherein a representation of the way of obtaining a control signal S through a control loop from equivalent circuits $S_1$ and $S_2$ is indicated. Note the indication for obtaining the Duty Cycle (DC) and compressor operating rotation $N_C$ values, as indicated in the above-mentioned Equations V and VI.

Figure 5:
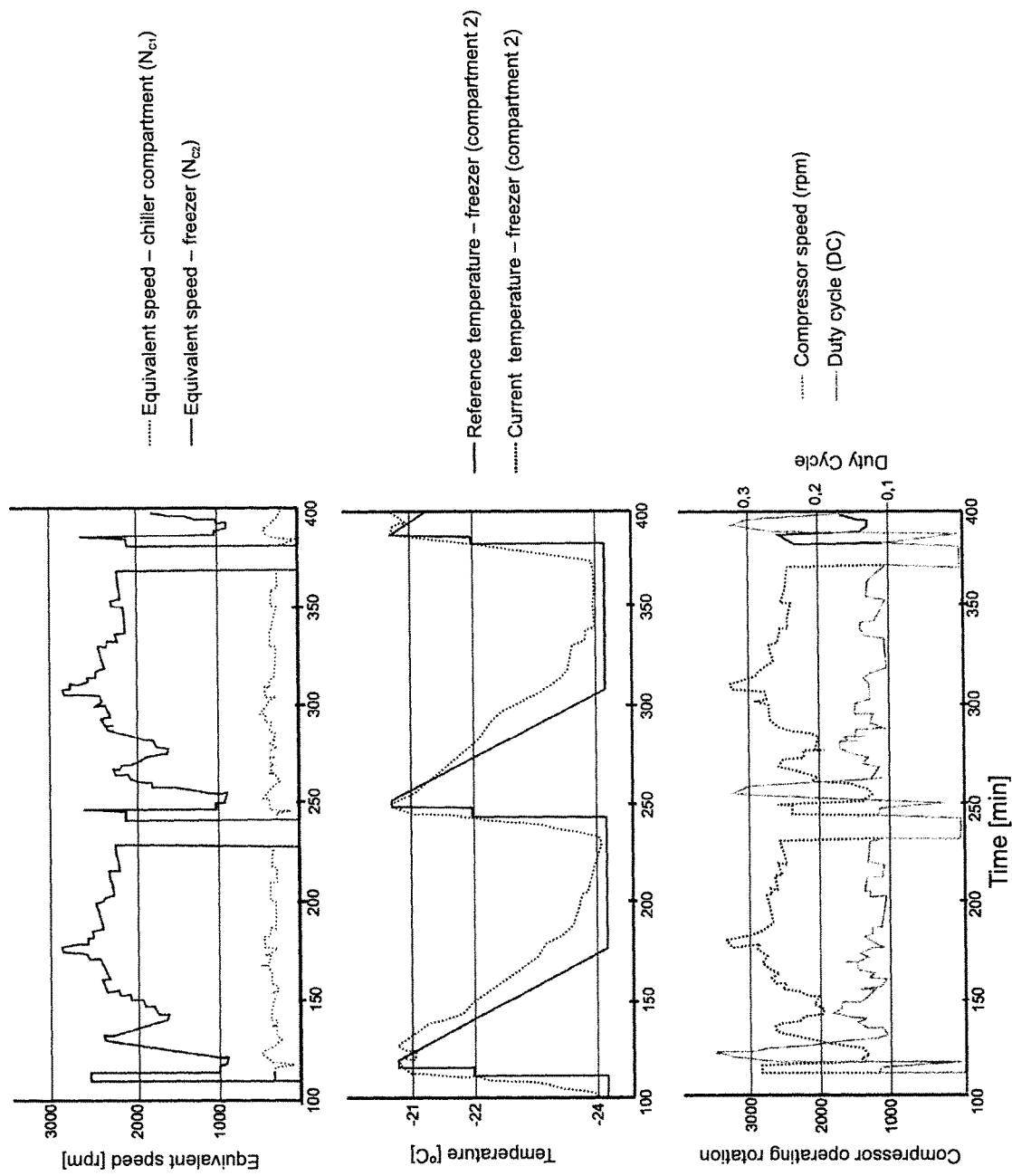
FIG. 5—presents graphic illustrations of the rotation parameters of the refrigerated environments as a function of time, the reference and current temperature values of one of the refrigerated environments as a function of time, and the control signal obtained, as set forth in the teachings of this invention.

FIG. 5 presents graphic illustrations of the rotation parameters for the first compartment $N_{C1}$ and the second compartment $N_{C2}$ respectively, as a function of time, the reference and current temperature values of the freezer (second compartment) as a function of time, and the compressor operating rotation $N_C$ and Duty Cycle (DC) values as set forth in the teachings of this invention.

Among other factors, FIG. 5 shows that the current temperature of the freezer (second compartment) is always aligned with the reference values, although minor variations may be seen, due mainly to the type of control loop $M_{C2}$ used.

With regard to FIG. 5, it is stressed that the rotation values of the first and second compartments $N_{C1}$ and $N_{C2}$ must be understood as the values obtained from the control loops $M_{C1}$ and $M_{C2}$, respectively.

Obviously, and as already addressed in the course of this Specification, the use of the proposed methodology in a refrigeration system fitted with two compartments $C_1$, $C_2$ does not constitute a characteristic imposing constraints on this invention.

Consequently, the concepts taught here may be applied perfectly well to a refrigeration system with N compartments, based on the following equations:

$$N_1 + N_2 + \ldots N_N = N_C;$$

$$DC_1 = \frac{N_1}{N_C};$$

$$DC_2 = \frac{N_2}{N_C}; \text{ and}$$

$$DC_N = \frac{N_N}{N_C};$$

Also knowing that $DC_1+DC_2+ \ldots DC_N=1$.

Aligned with the methodology described above, this invention also addresses a control system for a refrigeration system 10. More specifically, the proposed control system comprises control parameters $P_{C1}, P_{C2} \ldots P_{CN}$ that are independently associated with each of the refrigerated compartments $C_1, C_2 \ldots C_N$ of the refrigeration system 10, wherein the said control parameters $P_{C1}, P_{C2} \ldots P_{CN}$ are obtained from the control loops $M_{C1}, M_{C2} \ldots M_{CN}$ associated with each of the refrigerated environments, as shown in FIG. 3.

In one embodiment, the control parameters $P_{C1}, P_{C2} \ldots P_{CN}$ are related to the refrigeration system 10 capacity parameters, whereby the current temperature $T_{C1}, T_{C2} \ldots T_{CN}$ in each of refrigerated compartments $C_1, C_2 \ldots C_N$ respectively reaches reference temperature $T_{REFC1}, T_{REFC2} \ldots T_{CN}$.

Furthermore, and seamlessly aligned with the methodology described above, the control parameters $P_{C1}, P_{C2} \ldots P_{CN}$ are preferably configured as rotation parameters $N_{C1}, N_{C2} \ldots N_{CN}$ associated with each of the refrigerated compartments $C_1, C_2 \ldots C_N$, while control loops $M_{C1}, M_{C2} \ldots M_{CN}$ are preferably configured as proportional integral derivative controller (PID) controllers (in other embodiments, any controller may be used that works on an error signal).

Moreover, the control system proposed in this invention also comprises at least one electronic control configured to consolidate each of the control parameters $P_{C1}, P_{C2} \ldots P_{CN}$ of the refrigerated environments $C_1, C_2 \ldots C_N$ into a control signal S, whereby the electronic control is also configured to send the control signal S to the compressor 1. Moreover, the control signal S is linked to at least one of either a compressor operating rotation $N_C$ or a Cycle Ratio (DC) of the compressor.

As mentioned above, control signal S ensures that the current temperature $T_{C1}, T_{C2} \ldots T_{CN}$ of each of the refrigerated environments reaches the reference temperature $T_{REFC1}, T_{REFC2} \ldots T_{REFCN}$ for each of the environments.

The compressor operating rotation $N_C$ is equivalent to the sum of rotation parameters $N_{C1}, N_{C2} \ldots N_{CN}$ for each of the refrigerated environments $C_1, C_2 \ldots C_N$. The Cycle Ratio (DC) of the compressor is equivalent to a ratio between rotation parameter $N_{C1}$ linked to one of the suction lines (in this case the first suction line $L_1$) and the compressor operating rotation $N_C$.

This consequently addresses a method and control system for a refrigeration system 10 that uses a compressor 1 operating on more than one suction line, allowing independent control of each of the refrigerated compartments $C_1, C_2 \ldots C_N$.

Consequently, this invention allows the refrigeration system 10 using a single compressor to be transformed into an equivalent circuit fitted with two or more fictitious compressors, wherein each fictitious compressor is linked to a suction line; in other words, each fictitious compressor is linked to a refrigerated environment.

As a result, the temperatures of the refrigerated environments may be controlled in a completely independent manner, thus ensuring that actions raising/lowering the temperature in one compartment do not affect the temperature in the adjacent compartment.

It is valid to stress that the reference to two refrigerated environments may not be considered as a characteristic imposing constraint on this invention, whereby the teachings proposed herein may be applied in valid embodiments to an assortment (two or more) of refrigerated environments in a refrigeration system.

Along these lines, the teachings of this invention may be applied to the refrigeration system 10 as shown in FIG. 6, wherein the said refrigeration system is comprised of a first refrigeration system (condenser 1-evaporator 1) and a second refrigeration system (condenser 2-evaporators 2 and 3). In this case, the teachings proposed herein may be applied perfectly well to the second refrigeration system (condenser 2-evaporators 2 and 3).

Moreover, the methodology described here may be applied to refrigeration systems 10 whose suction lines are arrayed in series or in parallel, with this not constituting a characteristic imposing constraints on the invention.

Moreover, the configuration and distribution of the valves in the refrigeration system 10 do not constitute characteristics imposing constraints on this invention, whereby such valves may be arrayed inside or outside the compressor 1.

Furthermore, the reference to control parameters $P_{C1}, P_{C2} \ldots P_{CN}$ as being respectively rotation parameters $N_{C1}, N_{C2} \ldots N_{CN}$ of refrigerated environments $C_1, C_2 \ldots C_N$ may also not be considered as a characteristic imposing constraints on this invention. In other embodiments, control parameters $P_{C1}, P_{C2} \ldots P_{CN}$ may represent any parameter of the compressor 1 able to alter the refrigeration capacity of the system 10, such as: rotation, frequency, power, displaced gas volume and refrigerant fluid density, for example.

It is also stressed that the teachings of this invention are preferably applied to refrigeration systems that use variable capacity compressors. However, the concepts proposed herein may be used perfectly well with fixed capacity compressors (ON/OFF compressors), merely activating Cycle Ratio (Duty Cycle) of the compressor in order to do so, as it is not possible to alter the rotation levels of this compressor. This means that only the terms described above in Equation VI may be considered for fixed capacity compressors.

Furthermore, although a refrigeration system absorbing the teachings of this invention may include certain particularities, this in no way affects the methodology described above. For instance, the compressor gas distribution valve may be located inside or outside the compressor casing, and the compressor used may have only one or multiple rotation levels.

Finally, one of the variables in Equations V and VI (and their equivalents for a system with N refrigerated compartments) may be defined perfectly well as a constant variable (for example, the rotation of one of the refrigerated compartments), is introducing desired adaptations to the refrigeration system control method.

This consequently addresses a method and control system for a refrigeration system 10 using a compressor 1 that operates on more than one suction line $L_1, L_2 \ldots L_N$, allowing each of the suction lines $L_1, L_2 \ldots L_N$ of the compressor 1 to be controlled independently and thus ensuring that the temperature control of one compartment does not affect the temperature control of the adjacent compartment, thus avoiding the so-called temperature control crossover effect. This also addresses a refrigeration appliance 20 that encompasses the teachings of this invention.

Having described an example of a preferred embodiment, it must be understood that the scope of this invention encompasses other possible variations, being limited only by the content of the appended Claims, with possible equivalents included therein.

The invention claimed is:

1. A control method for a refrigeration system (10), the refrigeration system (10) comprising at least one compressor (1) and at least one pair of suction lines ($L_1$, $L_2$ ... $L_N$), with each of the suction lines ($L_1$, $L_2$ ... $L_N$) respectively associated with at least one refrigerated compartment ($C_1$, $C_2$, ... $C_N$), wherein the method comprises:

generating models of equivalent compressors for each suction line ($L_1$, $L_2$ ... $L_N$), such that a single compressor corresponding to the at least one compressor (1) and associated with the at least one pair of suction lines ($L_1$, $L_2$ ... $L_N$) is modeled as duplicate compressors equivalent to each other, with the equivalent compressors being modeled so as to operate at one or more control parameters ($P_{C1}$, $P_{C2}$ ... $P_{CN}$) associated with each of the refrigerated compartments ($C_1$, $C_2$, ... $C_N$), wherein the equivalent compressors are independent of each other, and each modeled compressor (1) is only associated with a respective suction line of the plurality of suction lines ($L_1$, $L_2$ ... $L_N$).

2. The method according to claim 1, wherein each of the equivalent compressors that are modeled corresponds to an independent compressor for each of the refrigerated compartments ($C_1$, $C_2$ ... $C_N$).

3. The method according to claim 2, wherein the control parameters ($P_{C1}$, $P_{C2}$, ... $P_{CN}$) are linked to the refrigeration system (10) capacity parameters, whereby a current temperature ($T_{C1}$, $T_{C2}$, ... $T_{CN}$) in each of the refrigerated compartments reaches the respective reference temperature ($T_{REFC1}$, $T_{REFC2}$, ... $T_{REFCN}$) for each of the refrigerated compartments.

4. The method according to claim 3, wherein the control parameters ($P_{C1}$, $P_{C2}$, ... $P_{CN}$) are independent for each of the refrigerated compartments ($C_1$, $C_2$ ... $C_N$) and are obtained from at least one control loop ($M_{C1}$, $M_{C2}$, ... $M_{CN}$) for each refrigerated compartment ($C_1$, $C_2$ ... $C_N$).

5. The method according to claim 4, wherein at least one of the control loops ($M_{C1}$, $M_{C2}$, ... $M_{CN}$) is configured as a controller that generates a capacity signal from an error signal.

6. The method according to claim 5, wherein the control parameters ($P_{C1}$, $P_{C2}$, ... $P_{CN}$) are configured as at least one among rotation parameters ($N_{C1}$, $N_{C2}$, frequency parameters, power parameters, displaced gas volume parameters and refrigerant fluid density parameters, associated with each of the refrigerated compartments ($C_1$, $C_2$ ... $C_N$).

7. The method according to claim 6, further comprising:
consolidating each of the control parameters ($P_{C1}$, $P_{C2}$, ... $P_{CN}$) for the refrigerated compartments ($C_1$, $C_2$ ... $C_N$) into a control signal (S); and
sending the control signal (S) to the compressor (1), whereby the control signal (S) is linked to at least one among a compressor operating rotation ($N_C$) and an operating fraction of the compressor ($DC_1$, $DC_2$, ... $DC_N$) for each suction line ($L_1$, $L_2$, ... $L_N$).

8. The method according to claim 7, wherein the compressor operating rotation ($N_C$) is equivalent to the sum of the rotation parameters ($N_{C1}$, $N_{C2}$, ... $N_{CN}$) for each of the refrigerated compartments ($C_1$, $C_2$ ... $C_N$).

9. The method according to claim 8, wherein the operating fraction ($D_{C1}$, $D_{C2}$, ... $D_{CN}$) is obtained from the relation between the rotation parameters ($N_{C1}$, $N_{C2}$, ... $N_{CN}$) one of the refrigerated compartments ($C_1$, $C_2$ ... $C_N$) and the compressor operating rotation ($N_C$).

10. The method according to claim 9, wherein the operating fraction ($D_{C1}$, $D_{C2}$, ... $D_{CN}$) is equivalent to a ratio between one of the rotation parameters ($N_{C1}$, $N_{C2}$, ... $N_{CN}$) and the compressor operating rotation ($N_C$).

11. The method according to claim 10, wherein the operating fraction ($D_{C1}$, $D_{C2}$, ... $D_{CN}$) is obtained from the rotation parameters ($N_{C1}$, $N_{C2}$, ... $N_{CN}$) of the compartment with the highest reference temperature ($C_1$).

12. The method according to claim 11, wherein the control signal (S) ensures that the current temperature ($T_{C1}$, $T_{C2}$, ... $T_{CN}$) of the refrigerated compartments reaches the reference temperature ($T_{REFC1}$, $T_{REFC2}$, $T_{REFCN}$) of the refrigerated compartments ($C_1$, $C_2$ ... $C_N$).

* * * * *

UNITED STATES PATENT AND TRADEMARK OFFICE
CERTIFICATE OF CORRECTION

| | |
|---|---|
| PATENT NO. | : 11,287,170 B2 |
| APPLICATION NO. | : 16/426520 |
| DATED | : March 29, 2022 |
| INVENTOR(S) | : Dietmar Erich Bernhard Lilie and Cristiano Candido Valerio |

It is certified that error appears in the above-identified patent and that said Letters Patent is hereby corrected as shown below:

In the Claims

Claim 6, Column 14, Lines 7-8:
Delete:
"among rotation parameters ($N_{C1}$, $N_{C2}$, frequency parameters"
Replace with:
--among rotation parameters ($N_{C1}$, $N_{C2}$, ... $N_{CN}$), frequency parameters--

Claim 6, Column 14, Line 10:
Delete:
"each of the refrigerated compartments ($C_1$, $C_2$...$C_N$."
Replace with:
--each of the refrigerated compartments ($C_1$, $C_2$ ... $C_N$).--

Claim 12, Column 14, Line 39:
Delete:
"reference temperature ($T_{REFC1}$, $T_{REFC2}$, $T_{REFCN}$) of the"
Replace with:
--reference temperature ($T_{REFC1}$, $T_{REFC2}$, ... $T_{REFCN}$) of the--

Signed and Sealed this
Second Day of August, 2022

*Katherine Kelly Vidal*
Katherine Kelly Vidal
*Director of the United States Patent and Trademark Office*